US009239730B2

(12) United States Patent
Mizrahi et al.

(10) Patent No.: US 9,239,730 B2
(45) Date of Patent: Jan. 19, 2016

(54) MANAGING CONNECTIONS IN A DISTRIBUTED VIRTUALIZATION ENVIRONMENT

(71) Applicants: Saggi Mizrahi, Fierberg (IL); Ayal Baron, Kiryat Ono (IL)

(72) Inventors: Saggi Mizrahi, Fierberg (IL); Ayal Baron, Kiryat Ono (IL)

(73) Assignee: Red Hat Israel, Ltd., Raanana (IL)

( * ) Notice: Subject to any disclaimer, the term of this patent is extended or adjusted under 35 U.S.C. 154(b) by 322 days.

(21) Appl. No.: 13/762,130

(22) Filed: Feb. 7, 2013

(65) Prior Publication Data

US 2014/0201736 A1     Jul. 17, 2014

Related U.S. Application Data

(60) Provisional application No. 61/751,650, filed on Jan. 11, 2013.

(51) Int. Cl.
*G06F 9/455* (2006.01)
(52) U.S. Cl.
CPC .. *G06F 9/45558* (2013.01); *G06F 2009/45579* (2013.01)

(58) Field of Classification Search
CPC ............ G06F 9/45545; G06F 9/45558; G06F 2009/45579
See application file for complete search history.

(56) References Cited

U.S. PATENT DOCUMENTS

| 2004/0054782 | A1* | 3/2004 | Donze et al. | 709/227 |
| 2011/0270945 | A1* | 11/2011 | Shiga et al. | 709/213 |
| 2012/0290729 | A1* | 11/2012 | Hardy et al. | 709/228 |
| 2013/0247133 | A1* | 9/2013 | Price et al. | 726/1 |

* cited by examiner

*Primary Examiner* — Nicholas Taylor
*Assistant Examiner* — Tania Pena-Santana
(74) *Attorney, Agent, or Firm* — Lowenstein Sandler LLP

(57) ABSTRACT

A host machine executing a connection agent receives a configuration identifying a set of connections to a plurality of storage servers. The host machine later receives a command to run a virtual machine. The host machine determines, based on the configuration, a particular connection of the set of connections to a particular storage server of the plurality of storage servers, the particular connection enabling access to data associated with the virtual machine that is stored by the particular storage server. The host machine then establishes the particular connection to the particular storage server without first receiving a command to establish the particular connection.

14 Claims, 7 Drawing Sheets

MANAGING CONNECTIONS IN A DISTRIBUTED VIRTUALIZATION ENVIRONMENT

RELATED APPLICATIONS

This patent application claims the benefit under 35 U.S.C. §119(e) of U.S. Provisional Application No. 61/751,605, filed Jan. 11, 2013, which is hereby incorporated by reference.

TECHNICAL FIELD

Embodiments of the present invention relate generally to managing connections between host machines and storage servers.

BACKGROUND

Enterprises that use virtual machines (VMs) such as virtual desktops for their employees may have many virtual machines (e.g., on the order of 100,000 virtual machines) stored in disk images on shared network storage. For a host machine to run a virtual machine, that host machine should have an established connection to the storage server that stores the disk image associated with that virtual machine. In traditional virtualization environments, host controllers issue connect commands to the host machine, the connect commands identifying particular storage servers to connect to and how to connect to those particular storage servers. After a connect command has been issued, the host controller issues run virtual machine commands to the host machine. The host controllers additionally issue disconnect commands to the host machine to cause the host machine to disconnect from the storage server.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
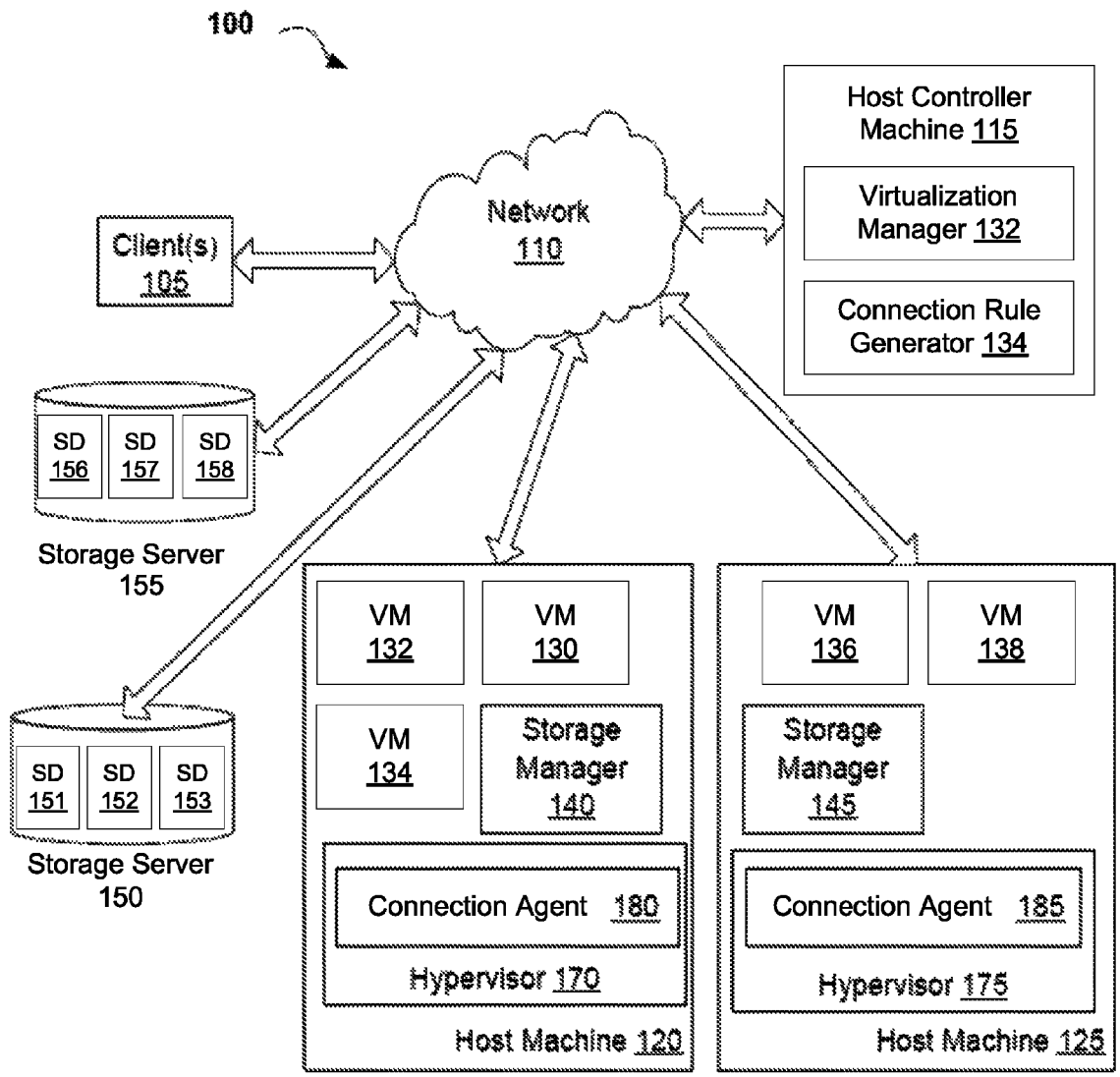
FIG. 1 is a block diagram illustrating an example of a network configuration according to one embodiment of the invention.

A system for managing connections from a host machine to storage servers is described. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

In traditional virtualization environments, host controllers direct hosts when to establish connections to storage servers and when to terminate such connections. However, in traditional virtualization environments the host controllers are not synchronized. Accordingly, a first host controller may issue a disconnect command to a host machine even though a second host controller is managing virtual machines running on the host machine that are still accessing the storage server. Moreover, in traditional virtualization environments virtual machines are associated with particular logical unit numbers (LUNs) or particular files and/or directories. However, such virtualization environments do not provide any correlation between LUNs (or files and/or directories) and storage servers that expose those LUNs. Accordingly, when a host controller issues a command to a host machine for the host machine to run a particular virtual machine, that host machine checks available LUNs to identify the LUN associated with that virtual machine. However, if the host machine has not previously received a command to connect to the storage server that exposes that LUN (e.g., if the host machine is not connected to the storage server), then the host machine will return an error.

According to one embodiment of the present invention, a connection agent running on a host machine receives a configuration from a host controller. The received configuration identifies a set of connections to storage servers for the host machine. The set of connections may include of the connections that the host machine may make to storage machines during operation. At some later time, the host machine receives a command to run a virtual machine. Responsive to the command, the connection agent determines from the configuration a particular connection of the set of connections to establish. The connection agent then establishes the particular connection to a storage server. The host machine may then load the virtual machine from a disk image stored by the storage server to which the connection has been established.

Embodiments improve the efficiency and effectiveness of accessing storage servers by host machines. Connection agents on the host machines are provided with configurations that include connections to be used by those host machines. The connection agents may make determinations as to when to establish, maintain and terminate each of the connections included in the configurations. Keeping many connections open may expose large numbers of storage domains, which may impact system speed and responsiveness. Accordingly, connections should be terminated when there is no purpose to maintaining them. However, the act of establishing connections consumes system resources, and also causes delay in the systems that will use the connections (e.g., causing delay in the loading of a virtual machine). Accordingly, connections that are to be used should be established and maintained. By effectively managing when to establish and when to terminate connections, a connection agent may improve a user experience and minimize the impact of both establishing connections and the impact of maintaining connections.

FIG. 1 is a block diagram illustrating an example of a network configuration 100 according to one embodiment of the invention. Network configuration 100 includes, but is not limited to, one or more clients 105 communicatively coupled to one or more host controller machines (host controllers) 115 and/or a host machine or machines (hosts) 120, 125 via a network 110. Network 110 may be a private network (e.g., a local area network (LAN) or a wide area network (WAN)), a public network (e.g., the Internet), or a combination of one or more networks.

Each host machine 120, 125 may be a computing device configured to host virtual machines. The host machines 120, 125 may be personal computers (PCs), server computers, mainframes, or other computing systems. The host machines 120, 125 may have a bare platform hardware that can include a processor, memory, input/output devices, etc. Each host machine 120, 125 may be a single machine or multiple host machines arranged in a cluster.

Host machines 120, 125 include a hypervisor 170, 175 (also known as a virtual machine monitor (VMM)). The hypervisor 170, 175, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. The hypervisor 170, 175 presents to other software (i.e., "guest" software) the abstraction of one or more virtual machines (VMs) 130-138. These virtual machines 130-138 may provide the same or different abstractions to various guest software (e.g., guest operating system, guest applications, etc.).

A virtual machine 130-138 is a combination of guest software that uses an underlying emulation of a hardware machine (e.g., as provided by a hypervisor). The guest software may include a guest operating system, guest applications, guest device drivers, etc. Virtual machines 130-138 can be, for example, hardware emulation, full virtualization, para-virtualization, and operating system-level virtualization virtual machines. In one embodiment, each virtual machine 130-138 hosts or maintains a desktop environment providing virtual desktops for remote clients (e.g., client 105) and/or local clients (e.g., that use attached input/output devices). A virtual desktop is a virtualized desktop computer, and thus may include storage, an operating system, applications installed on the operating system (e.g., word processing applications, spreadsheet applications, email applications, etc.), and so on. However, rather than these functions being provided and performed at the client 105, they are instead provided and performed by a virtual machine 130-138. A virtual desktop can represent an output (e.g., an image to be displayed) generated by a desktop application running within a virtual machine. Graphics data associated with the virtual desktop can be captured and transmitted to a client 105, where the virtual desktop may be rendered by a rendering agent and presented by a client application (not shown). In other embodiments, virtual machines 130-138 are not virtual desktops.

Each host machine 120, 125 may establish one or more connections to one or more storage servers 150, 155. Each storage server 150, 155 may include a shared network storage device or collection of network storage devices (e.g., which may be arranged in an array such as a RAID array) that can be accessed by multiple hosts. These network storage devices may be block-level devices (e.g., a storage area network (SAN) device), file-level devices (e.g., a network attached storage (NAS) device), or a combination of both. Each storage server may be considered a connection target.

Each storage server 150-155 includes a collection of storage domains (SDs) 151-153, 156-158. Storage domains 151-153, 156-158 may be logical unit numbers (LUNs) if storage servers 150, 155 include block devices. Storage domains 151-153, 156-158 may be files and/or directories if storage servers 150, 155 include file systems. Storage domains 151-153, 156-158 may store disk images. Each disk image is a file or collection of files that is interpreted by hypervisors 170, 175 as a hard disk. The disk image may encapsulate a virtual machine 130-138, which may include an OS, installed applications, directory structure, files, etc. for the VM. The hypervisor 170, 175 loads the VMs 130-138 by mounting the disk images and starting the OS included in the disk image. The copy of the disk image stored by a storage server 150, 155 may be a definitive up-to-date copy for the virtual machine 130-138. Accordingly, whenever a VM 130-138 is to be started, the host machine 120, 125 that will host the VM 130-138 accesses the storage domain 151-153, 156-158 to load the VM 130-138 from the disk image.

In one embodiment, the host machines 120, 125 each include a connection agent 180, 185 that manages connections to the storage servers 150, 155. The connection agents 180, 185 may be components of hypervisors 170, 175 (as shown), or may be separate applications on host machines 120, 125. Connection agents 180, 185 may each receive a configuration (e.g., a configuration file) from a host controller machine 115. A configuration for a host machine includes information for some or all of the connections that might be made by that host machine. Each connection included in a configuration file includes the information that will be used to establish that connection to a storage server 150, 155. Such information may include a server type for the storage server (e.g., whether the storage server is a block device or a file system device), a protocol to be used for communicating with the storage server 150, 155 (e.g., iSCSI, NFS, CIFS, etc.), an address of the storage server (e.g., an internet protocol (IP) address), and so on. If the connection is to be a secure connection, then the information for that connection in the configuration may include a security protocol to use, credentials for performing authentication and/or other information.

Different configuration files may be received from different host controller machines. A single host machine 120 may operate using multiple configuration files in parallel. In such an implementation, if a connection is to be established responsive to an instruction from a first host controller, then a first configuration associated with that host controller may be used for that connection. If a connection is to be established responsive to an instruction from a second host controller, then a second configuration associated with that second host controller may be used for the connection.

Multiple configurations may be received from a host controller machine 115, where each configuration is associated with a different client 105. The multiple configurations may each include a connection to the same target storage server (e.g., to storage server 150). In one embodiment, each configuration includes a set of names for the connections included in the configuration. For example, two different entities may provide configurations that include the same connection to the same storage server. That same connection may have a different name in the configurations of the first entity and the second entity. For example, if a connection is established for the first entity, that connection may be assigned a name based on the name for the connection from the configuration of the first entity. Therefore, the host machine may identify which entity a connection was established for based on a name assigned to the connection.

At any time a connection agent 180, 185 may receive a configuration update from a host controller machine 115. The configuration update may be a complete replacement configuration or may just include changes from a previous version of the configuration. Some configuration updates may have time limits associated with them. In such an example, connections would be established based on the updated configuration until a specified time limit expires. After the time limit expires, the previous configuration (prior to the update) may be used to establish connections.

If a first configuration for a first client is removed from a host machine 120, 125, that host machine may still connect to that storage server for the other client using the second configuration. This allows for safe sharing of a storage resource without the risk of connections to the storage resource being removed when a client that shares that storage resource removes information for the storage resource from a configuration.

Some host machines include a storage manager 140, 145 that manages the storage target that the host machine is connected to. For example, host machine 120 includes a storage manager 140 that manages storage target 150 and host machine 125 includes a storage manager 145 that manages storage target 155. The storage manager 140, 145 may be responsible for receiving instructions from virtual machines that are meant for the managed storage server 150, 155, and performing operations on data in the storage server 150, 155 based on the instructions. The instructions may be received from VMs on the host hosting the storage manager, from VMs on other hosts and/or from the host controller machine 115.

The host machines 120, 125 may be coupled to host controller machine 115 (via network 110 as shown or directly). The host controller machine 115 may monitor and control one or more functions of host machines 120, 125. In one embodiment, the host controller machine 115 includes a virtualization manager 132 that manages virtual machines 130-138. The virtualization manager 132 may manage one or more of provisioning of new virtual machines, connection protocols between clients and virtual machines, user sessions (e.g., user authentication and verification, etc.), backup and restore, image management, virtual machine migration, load balancing, virtual machine loading, and so on. Virtualization manager 132 may, for example, add a virtual machine, delete a virtual machine, balance the load on a host machine cluster, assign a portion of a user's storage quota to a virtual machine 130-138, cause a host machine 120, 125 to run a virtual machine, and/or perform other management functions.

The virtualization manager 132 in one embodiment acts as a front end for the host machines 120, 125. Thus, clients 105 log in to the virtualization manager 132, and after successful login the virtualization manager 132 issues commands to the host machines to cause virtual machines 130-138 to be loaded on those host machines, and then connects the clients to the virtual machines 130-138. In another embodiment, clients 105 directly access the host machines 120, 125 without going through virtualization manager 132.

Each client 105 may be a personal computer (PC), palm-sized computing device, personal digital assistant (PDA), etc. Clients 105 may be fat clients (clients that perform local processing and data storage), thin clients (clients that perform minimal or no local processing and minimal to no data storage), and/or hybrid clients (clients that perform local processing but little to no data storage). In one embodiment, clients 105 essentially act as input/output devices, in which a user can view a desktop environment provided by a virtual machine 130-138 (e.g., a virtual desktop) on a monitor, and interact with the desktop environment via a keyboard, mouse, microphone, etc. In one embodiment, a majority of the processing is not performed at the clients 105, and is instead performed by virtual machines 130-138 hosted by the host machines 120, 125.

Figure 2:
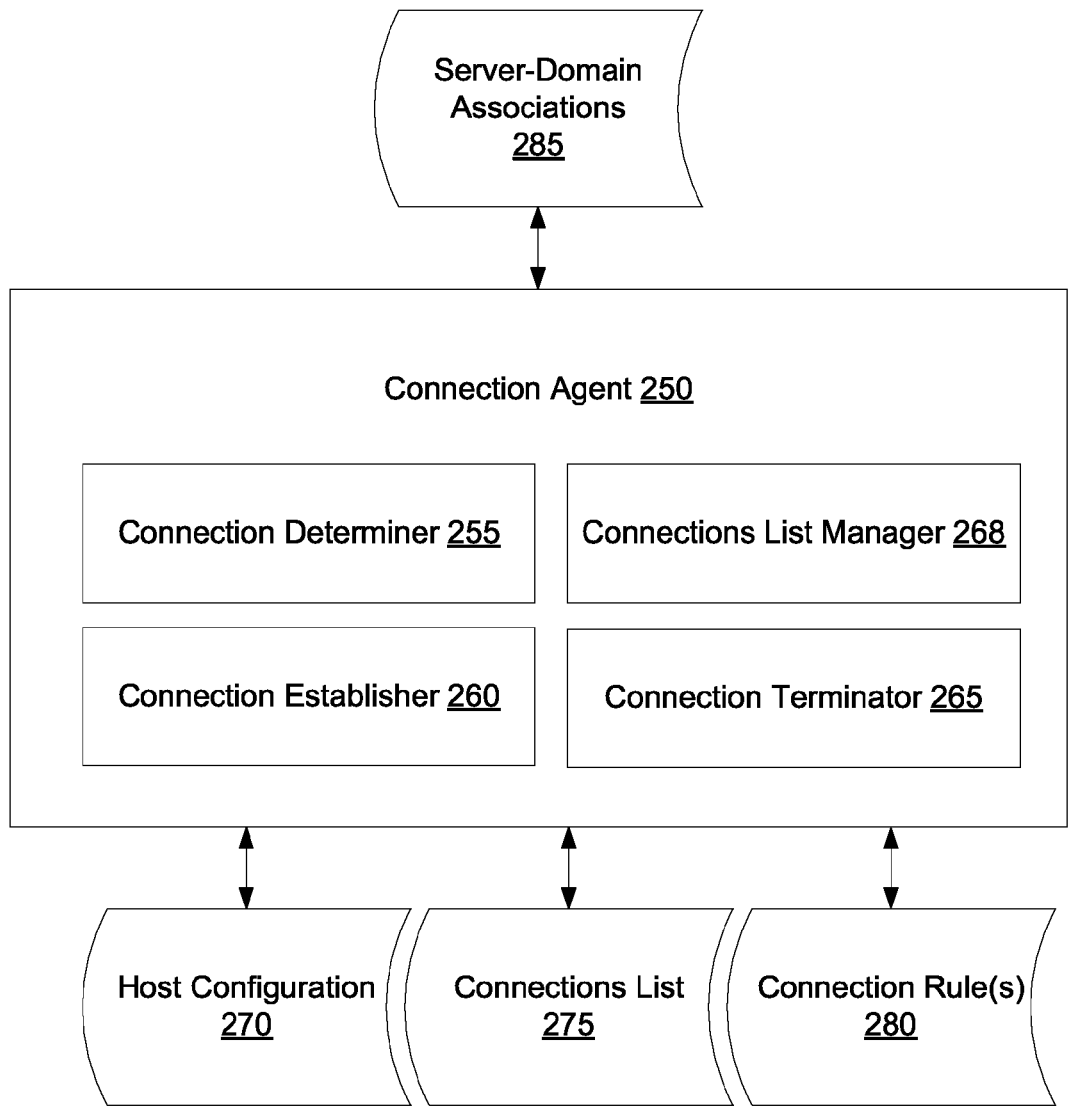
FIG. 2 is a block diagram illustrating one embodiment of a connection agent.

FIG. 2 is a block diagram illustrating one embodiment of a connection agent 250. In one embodiment, the connection agent 250 corresponds to a connection agent 180, 185 of FIG. 1. The connection agent 250 manages connections to storage servers, which may be referred to as connection targets.

Connection agent 250 has access to a host configuration 270, which it may receive from a host controller. The host configuration 270 may include the information that will be used to establish connections to the storage servers. Examples of such information includes credentials for accessing the storage servers (e.g., digital certificates, login names, passwords, etc.), connection protocols, addresses of the storage servers, and so forth.

In one embodiment, the connection agent 250 includes a connection determiner 255, a connection establisher 260, a connection terminator 265 and a connections list manager 268. The connection determiner 255 determines whether and when to establish connections to storage servers as well as when to terminate the connections to those storage servers. Connection determiner 255 may treat each connection as a resource. Connection determiner 255 may determine when a particular connection should be established or maintained. A connection should be established or maintained whenever it will be used by a virtual machine or other process running on the host machine that includes the connection agent 250. For example, a connection to a storage server may be used if that storage server includes a LUN having a virtual disk image for a virtual machine that is to be loaded on the host machine or that is running on the host machine. Additionally, the connection may be used if a snapshot or backup operation is to be performed on data stored by that storage server.

If connection determiner 255 determines that a connection should be established, connection establisher 260 establishes the connection using the information for that connection in the host configuration 270. Once the connection is established, connections list manager 268 may add an entry for the connection to a connections list 275. The entry may identify the connection and the virtual machine or other process that uses the connection. If multiple processes or virtual machines use a particular connection, then the connections list would include multiple entries for that connection.

Connections list manager 268 removes entries for a connection from the connections list 275 after virtual machines or other processes no longer use the connection. For example, if a virtual machine that was using a connection is shut down, then an entry for that connection associated with the virtual machine would be removed from the connection list 275. Connection determiner 255 monitors the connections list 275 to determine if an existing connection should be terminated. If connection determiner 255 identifies that there are no entries in the connections list for an existing connection, then connection determiner 255 may direct connection terminator 265 to terminate that connection.

In one implementation, connection determiner 255 starts a timer once there are no more entries for a particular connection in the connections list 275. If another entity is added to the connections list 275 for the connection before the timer times out, then the connection is not terminated. If the timer times out before such an entry is added to the connections list 275, then the connection may be terminated. The timer may have a time limit of 2 seconds, 30 seconds, 5 minutes, or some other time.

Connection agent 250 may have access to one or more connection rules 280. The connection rules 280 may identify particular circumstances under which a connection should be established. In addition to determining that a connection should be established when a process or virtual machine is to use that connection, connection determiner 255 may determine that a connection should be established if one or more connection rules are satisfied. Examples of such connection rules may be load balancing rules. For example, for block devices multipathing may be implemented, in which multiple connections are established to a single storage server. A load balancing connection rule may trigger establishment of a parallel connection to a storage server that a host is already connected to if a load on the existing connection reaches a threshold. Another type of connection rule 280 may be a time/date based connection rule. Such a connection rule may specify that a particular connection should be established on a certain time and/or date. For example, many virtual machines may commonly be started up around 8AM Monday through Friday as users begin their work day. A date/time connection rule may open connections in anticipation of such activity. Other types of connection rules are also possible.

Connection determiner 255 may identify associations between storage domains (e.g., LUNs, files, directories, etc.) and storage servers. Such associations of storage domains to a storage server may be identified after a connection to that storage server has been established. The connection exposes the storage domains provided by the storage server. Once such an association is identified, connection determiner 255 may cache this server-domain association 285.

In one embodiment, a user interface is provided that enables a user to discover and connect to different storage servers. For example, host controller machine 115 may scan for available storage servers 150, 155 and provide a list of such available storage servers to a user. The user may select one or more of those storage servers, and host controller machine 115 may attempt to connect to them. If a connection uses credentials, then host controller machine 115 may prompt the user to provide such credentials. Once the user successfully connects to the storage server, host controller machine 115 may store information associated with that connection, including the storage server's address, any credentials that were used for the connection, and so forth. Host controller machine 115 may also record a list of storage domains provided by that storage server, and may associate the storage domains to the storage server.

When a host controller requests that a virtual machine be loaded, that host controller will typically provide a storage domain of that virtual machine. However, that host controller will not typically provide any information on a storage server that exposes that storage domain or a connection that should be used to enable access to that storage domain. By caching the server-domain associations, the connection determiner 255 is able to later identify specific connections that will be used to load and run a requested virtual machine. The connection determiner 255 may instruct connection establisher 260 to establish the identified connection to the identified storage server without first receiving any connection command from the host controller and without receiving an identification of the particular storage server and connection to use.

Figure 3:
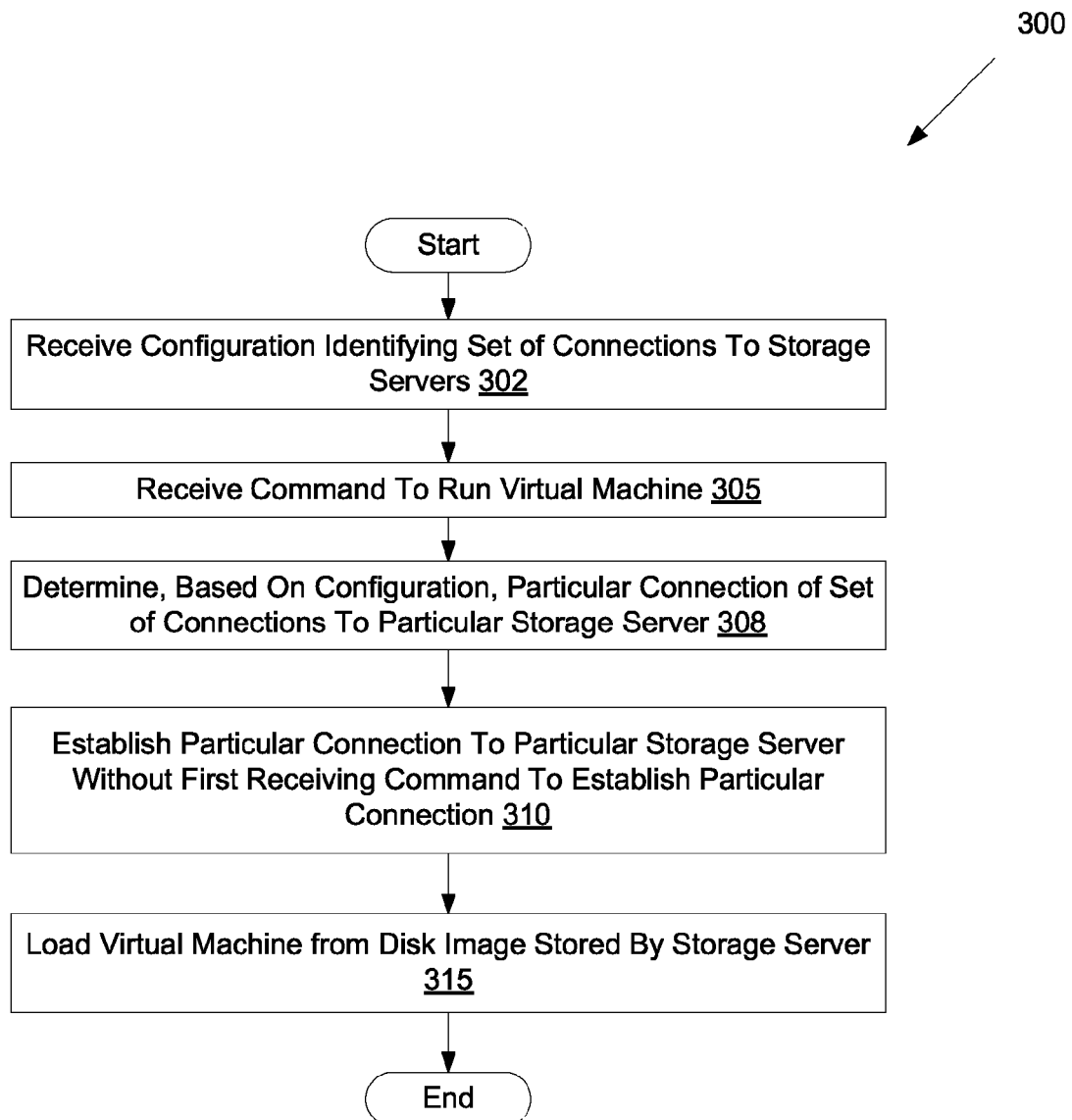
FIG. 3 is a flow diagram illustrating one embodiment for a method of managing connections for a host machine.
Figure 4:
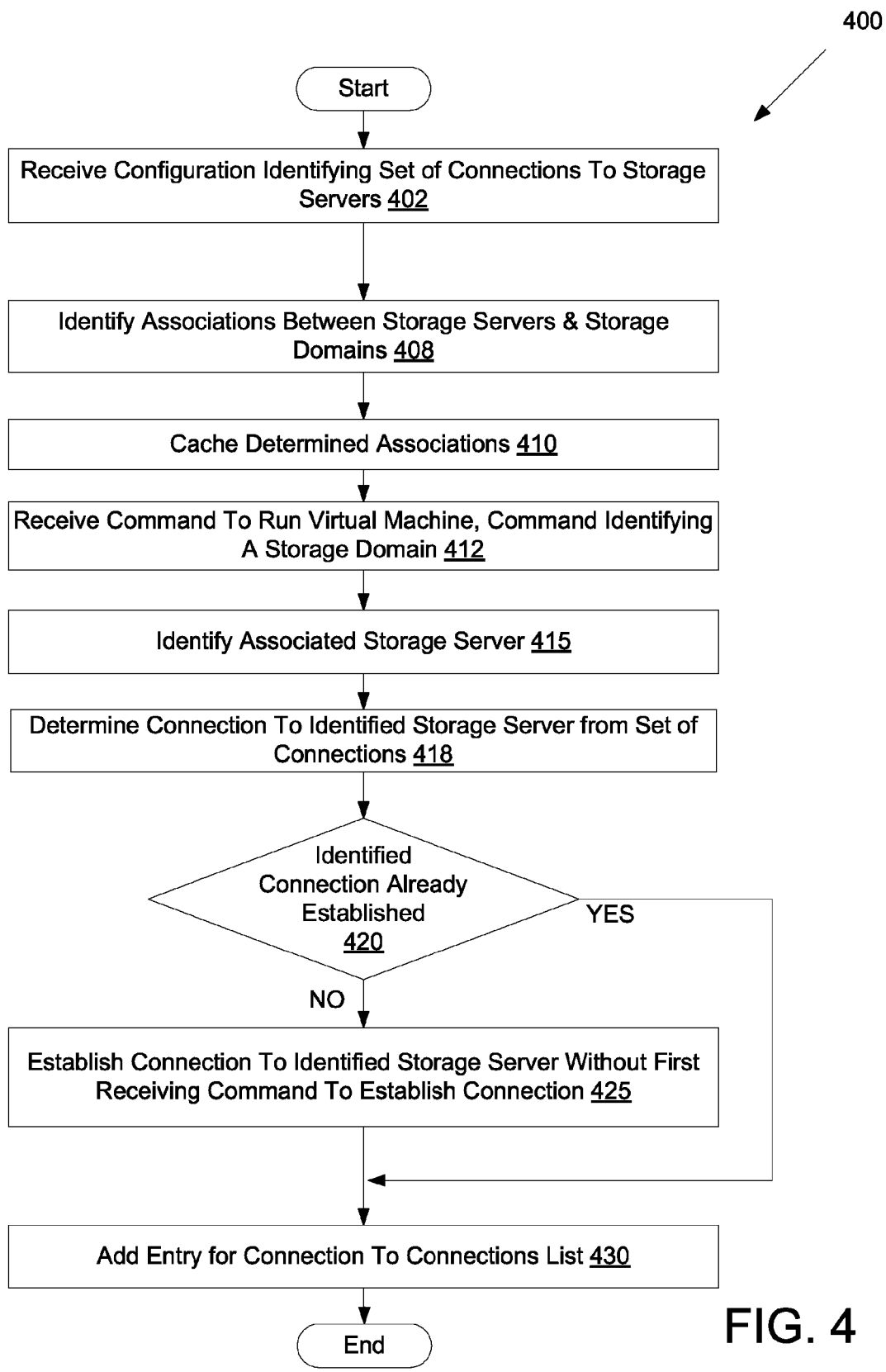
FIG. 4 is a flow diagram illustrating another embodiment for a method of managing connections to a host machine.
Figure 5:
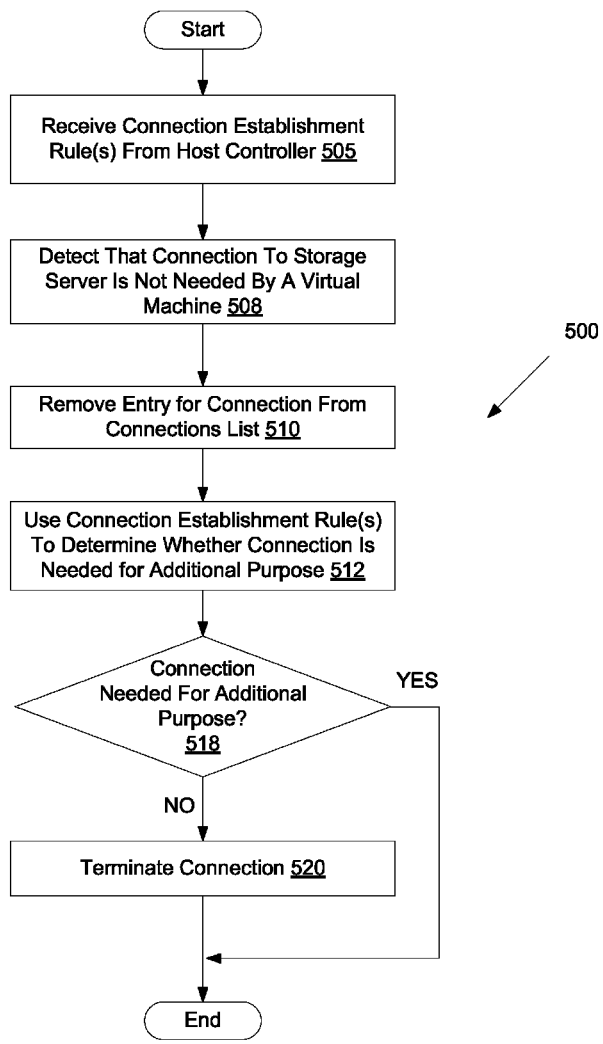
FIG. 5 is a flow diagram illustrating yet another embodiment for a method of managing connections for a host machine.

FIGS. 3-5 are flow diagrams illustrating embodiments for methods of managing connections to storage servers for a host machine. These methods may be performed by processing logic that may comprise hardware (circuitry, dedicated logic, etc.), software (such as is run on a general purpose computing device or a dedicated machine), or a combination of both. In one embodiment, these methods are performed by a host machine (e.g., by a connection agent running on a host machine, as depicted in FIGS. 1 and 2).

Referring to FIG. 3, at block 305 of a method 300, a host machine receives a configuration identifying a set of connections to storage servers. At block 305, the host machine receives a command to run a virtual machine. At block 308, the host machine determines, based on the configuration, a particular connection of the set of connections to a particular storage server. The connection may be a connection to a specific storage server having a storage domain (e.g., a LUN or directory) that includes a disk image for the virtual machine.

At block 310, the host machine establishes the particular connection to the particular storage server without first receiving a command to establish that particular connection. At block 315, the host machine loads the virtual machine from a disk image storage by the storage server.

Referring to FIG. 4, at block 402 of a method 400, a host machine receives a configuration file identifying a set of connections to storage servers. At block 408, the host machine identifies associations between storage servers that are connection targets in the set of connections and storage domains. This may be performed by temporarily establishing connections (from the set of connections) to those storage servers. Once a connection to a storage server is established, the storage domains exposed by that storage server are made available. At block 410, the host machine caches the determined associations.

At block 412, the host machine receives a command to run a virtual machine. The command may identify a particular storage domain on which a disk image for that virtual machine resides. At block 415, the host machine identifies the storage server associated with that provided storage domain using the cached associations. At block 418, the host machine determines a connection to the identified storage server from the set of connections.

At block 420, the host machine determines whether the identified connection has already been established. If the identified connection is already established, the method proceeds to block 430. Otherwise, the method continues to block 425. At block 425, the host machine establishes the connection to the identified storage server. The connection is established without first receiving a command to establish the connection. At block 430, an entry for the connection is added to a connections list.

Referring to FIG. 5, at block 505 of a method 500, a host machine receives one or more connection establishment rules from a host controller. At block 508, the host machine detects that a connection to a storage server is no longer used by a virtual machine (e.g., such as if the virtual machine has been terminated). At block 510, the host machine removes an entry for the connection from a connections list. At block 512, the host machine determines whether the connection will be used or should be maintained for any additional purpose using the connection rules. Such connection rules may specify that particular connections are to be maintained during particular time periods (e.g., during business hours). Other connection rules may specify that a connection is to be maintained for a time period after a last user of the connection has stopped using the connection. Other connection rules may specify that a connection is to be maintained to a backup storage server. Other connection rules are also possible.

At block 518, the method continues to block 520 and the connection is terminated if the connection will not be used and/or is not to be maintained. If the connection is still to be used or maintained for another purpose (e.g., for another virtual machine that is still running), then the connection remains active.

Figure 6:
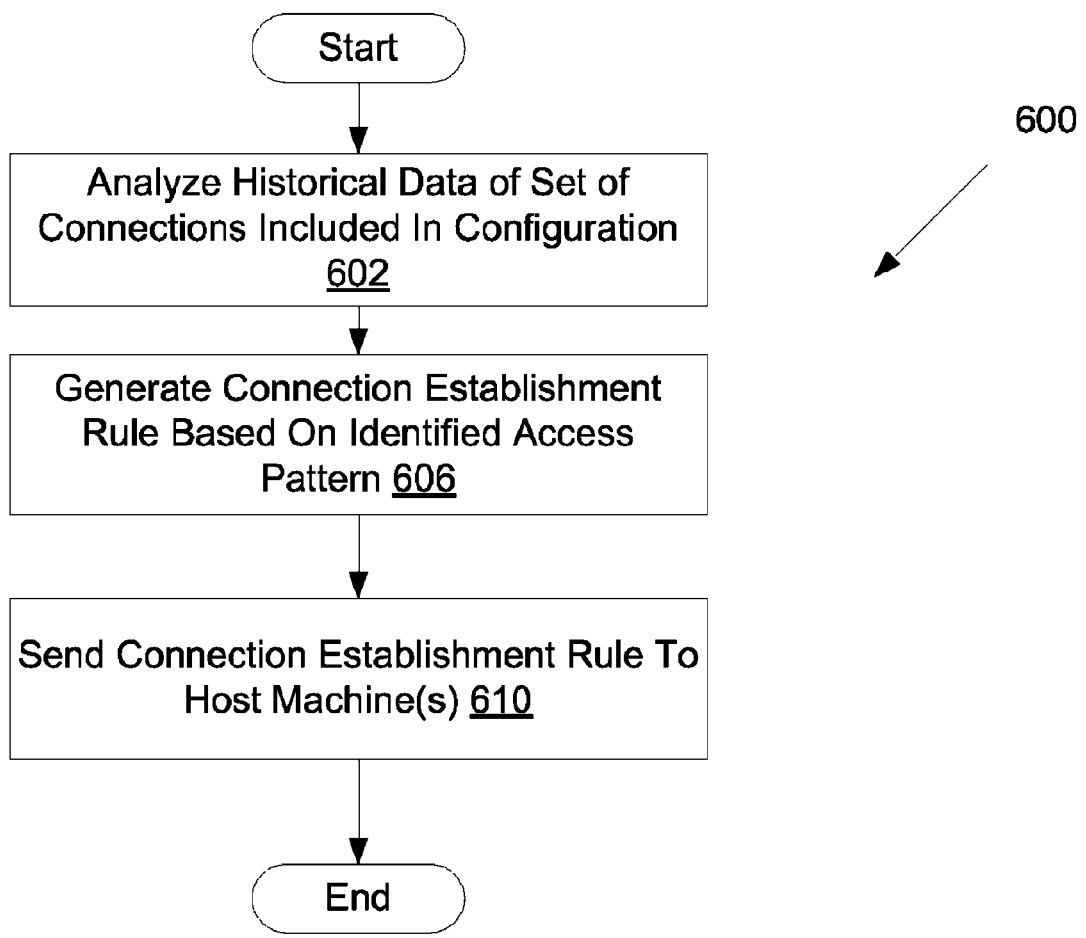
FIG. 6 is a flow diagram illustrating one embodiment for a method of generating connection establishment rules.

FIG. 6 is a flow diagram illustrating one embodiment for a method 600 of generating connection establishment rules. Method 600 may be performed by processing logic that may comprise hardware (circuitry, dedicated logic, etc.), software (such as is run on a general purpose computing device or a dedicated machine), or a combination of both. In one embodiment, method 600 is performed by a host controller machine.

At block 602 of method 600 processing logic analyzes historical data of a set of connections included in a configuration. Based on the analysis, processing logic may identify one or more access patterns to storage servers that are connection targets for the connections in the set of connections. At block 606, processing logic generates one or more connection establishment rules based on the identified access patterns. For example, if the historical data shows that users typically load VMs at 8 AM, then a rule establishing a connection to a storage server storing disk images for those VMs at 7:50 AM may be generated. At block 610, processing logic sends the connection establishment rule (or rules) to host machines that use the configuration. These host machines may then apply the connection rules to determine when to establish and when to terminate particular connections.

Figure 7:
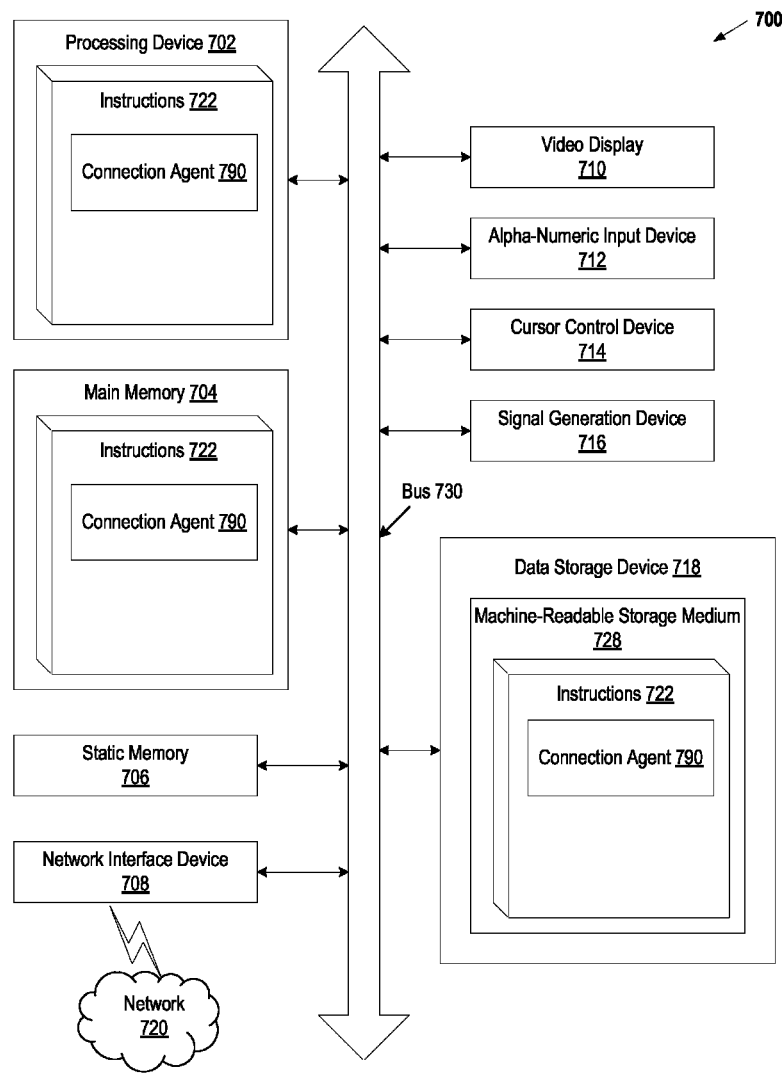
FIG. 7 illustrates a diagrammatic representation of a machine in the exemplary form of a computing device.

FIG. 7 illustrates a diagrammatic representation of a machine in the exemplary form of a computing device 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computing device 700 may further include a network interface device 708. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The software 722 may also reside, completely or at least partially, within the main memory 704 and/or within the processing device 702 during execution thereof by the computing device 700, the main memory 704 and the processing device 702 also constituting machine-readable storage media.

The machine-readable storage medium 728 may also be used to store instructions for a connection agent 790 and/or a software library containing methods that call a connection agent. While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "determining" or "establishing" or "adding" or "starting" or the like, refer to the actions and processes of a computing device, or similar electronic computing device, that manipulates and transforms data represented as physical (electronic) quantities within the computing device's registers and memories into other data similarly represented as physical quantities within the computing device memories or registers or other such information storage devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
   receiving, by a host machine executing a connection agent, a configuration identifying a set of connections to a plurality of storage servers;
   receiving a command to run a virtual machine by the host machine;
   determining, based on the configuration, a particular connection of the set of connections to a particular storage server of the plurality of storage servers, the particular connection enabling access to data associated with the virtual machine that is stored by the particular storage server;
   establishing, by the host machine, the particular connection to the particular storage server without first receiving a command to establish the particular connection;
   adding an entry for the particular connection to a connections list, the entry identifying the particular connection and the virtual machine;
   responsive to detecting that the particular connection to the particular storage server is no longer used by the virtual machine, removing the entry for the particular connection from the connections list;
   after removing the entry for the particular connection from the connections list, determining whether the particular connection is used for any additional purpose based on checking the connections list to identify additional entries for the particular connection; and
   responsive to determining that there are no additional entries for the particular connection in the connections list, terminating the particular connection.

2. The method of claim 1, further comprising:
   detecting that the particular connection to the particular storage server has been broken; and
   reestablishing the particular connection to the particular storage server without first receiving a command to reestablish the particular connection.

3. The method of claim 1, wherein each storage server comprises a plurality of storage domains, each of the plurality of storage domains comprising at least one of a logical unit number (LUN), a directory or a file, the method further comprising:
   determining associations between individual storage servers of the plurality of storage servers and individual storage domains of the plurality of storage domains; and
   caching the determined associations.

4. The method of claim 3, wherein the cached associations comprise a particular cached association between the particular storage server and a particular storage domain, and wherein the command to run the virtual machine identifies the particular storage domain, the method further comprising:
   determining the particular connection to establish in view of the cached association.

5. The method of claim 1, further comprising:
   analyzing historical data of the set of connections to identify an access pattern for at least one connection of the set of connections;
   generating a connection establishment rule in view of the identified access pattern;
   making a determination that an additional connection of the set of connections is likely to be used in view of the rule; and
   establishing the additional connection responsive to making the determination.

6. A non-transitory computer readable storage medium having instructions that, when executed by a host machine, cause the host machine to:
   receive, by the host machine, a configuration identifying a set of connections to a plurality of storage servers;
   receive a command to run a virtual machine by the host machine;
   determine, in view of the configuration, a particular connection of the set of connections to a particular storage server of the plurality of storage servers, the particular connection enabling access to data associated with the virtual machine that is stored by the particular storage server; and
   establish, by the host machine, the particular connection to the particular storage server without first receiving a command to establish the particular connection;
   add an entry for the particular connection to a connections list, the entry identifying the particular connection and the virtual machine;
   responsive to detecting that the particular connection to the particular storage server is no longer used by the virtual machine, remove the entry for the particular connection from the connections list;
   after removing the entry for the particular connection from the connections list, determine whether the particular connection is used for any additional purpose based on checking the connections list to identify additional entries for the particular connection; and
   responsive to determining that there are no additional entries for the particular connection in the connections list, terminate the particular connection.

7. The non-transitory computer readable storage medium of claim 6, wherein the instructions further cause the host machine to:
   detect that the particular connection to the particular storage server has been broken; and
   reestablish the particular connection to the particular storage server without first receiving a command to reestablish the particular connection.

8. The non-transitory computer readable storage medium of claim 6, wherein each storage server comprises a plurality of storage domains, each of the plurality of storage domains comprising at least one of a logical unit number (LUN), a directory or a file, and wherein the instructions further cause the host machine to:
   determine associations between individual storage servers of the plurality of storage servers and individual storage domains of the plurality of storage domains; and
   cache the determined associations.

9. The non-transitory computer readable storage medium of claim 8, wherein the cached associations comprise a particular cached association between the particular storage server and a particular storage domain, wherein the command to run the virtual machine identifies the particular storage domain, and wherein the instructions further cause the host machine to:
   determine the particular connection to establish in view of the particular cached association.

10. The non-transitory computer readable storage medium of claim 6, wherein the instructions further cause the host machine to:

analyze historical data of the set of connections to identify an access pattern for at least one connection of the set of connections;
generate a connection establishment rule in view of the identified access pattern;
make a determination that an additional connection of the set of connections is likely to be used in view of the rule; and
establish the additional connection responsive to making the determination.

11. A host machine comprising:
a memory; and
a processing device coupled to the memory, wherein the processing device is to:
receive a configuration identifying a set of connections to a plurality of storage servers;
receive a command to run a virtual machine;
determine, in view of the configuration, a particular connection of the set of connections to a particular storage server of the plurality of storage servers, the particular connection enabling access to data associated with the virtual machine that is stored by the particular storage server;
establish the particular connection to the particular storage server without first receiving a command to establish the particular connection;
add an entry for the particular connection to a connections list, the entry identifying the particular connection and the virtual machine;
responsive to detecting that the particular connection to the particular storage server is no longer used by the virtual machine, remove the entry for the particular connection from the connections list;
after removing the entry for the particular connection from the connections list, determine whether the particular connection is used for any additional purpose based on checking the connections list to identify additional entries for the particular connection; and
responsive to determining that there are no additional entries for the particular connection in the connections list, terminate the particular connection.

12. The host machine of claim 11, wherein the processing device is further to:
detect that the particular connection to the particular storage server has been broken; and
reestablish the particular connection to the particular storage server without first receiving a command to reestablish the particular connection.

13. The host machine of claim 11, wherein each storage server comprises a plurality of storage domains, each of the plurality of storage domains comprising at least one of a logical unit number (LUN), a directory or a file, and wherein the processing device is further to:
determine associations between individual storage servers of the plurality of storage servers and individual storage domains of the plurality of storage domains; and
cache the determined associations.

14. The host machine of claim 13, wherein the cached associations comprise a particular cached association between the particular storage server and a particular storage domain, wherein the command to run the virtual machine identifies the particular storage domain, and wherein the processing device is further to determine the particular connection to establish in view of the particular cached association.

* * * * *